US007148972B2

(12) United States Patent
Rekimoto

(10) Patent No.: US 7,148,972 B2
(45) Date of Patent: Dec. 12, 2006

(54) POSITION RECOGNIZING DEVICE AND POSITION RECOGNIZING METHOD

(75) Inventor: Junichi Rekimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 296 days.

(21) Appl. No.: 10/447,639

(22) Filed: May 29, 2003

(65) Prior Publication Data

US 2003/0223085 A1 Dec. 4, 2003

(30) Foreign Application Priority Data

May 29, 2002 (JP) ............................ P2002-156044

(51) Int. Cl.
*G01B 11/14* (2006.01)
*G01J 1/04* (2006.01)
*G01J 1/42* (2006.01)
*G01J 5/08* (2006.01)

(52) U.S. Cl. ...................................................... 356/614
(58) Field of Classification Search ...................... None
See application file for complete search history.

(56) References Cited

U.S. PATENT DOCUMENTS 3,526,893 A * 9/1970 Skenderoff et al. ......... 342/189

3,882,482 A * 5/1975 Green et al. ................... 341/9
6,559,935 B1 * 5/2003 Tew ........................ 356/139.03
7,034,283 B1 * 4/2006 Williams et al. ........ 250/231.16
2002/0191261 A1 * 12/2002 Notargiacomo et al. .... 359/181

FOREIGN PATENT DOCUMENTS

JP 08304541 A * 11/1996

* cited by examiner

*Primary Examiner*—Hwa (Andrew) Lee
*Assistant Examiner*—Gordon J. Stock, Jr.
(74) *Attorney, Agent, or Firm*—Sonnenschein Nath & Rosenthal LLP

(57) ABSTRACT

LEDs are driven by pseudorandom number sequences unique to the LEDs, respectively, and emit light having light intensity change corresponding to their respective pseudorandom number sequences. The light from the LEDs enters a PSD. The PSD outputs currents having levels corresponding to intensity of bright spot images occurring at incident positions of the light and the incident positions. Matched filters subject the outputs of the PSD to correlation operation processing, thereby separate outputs corresponding to each LED, and then supply the outputs to a decoding circuit. The decoding circuit generates an output signal for each light source photographed, which signal comprises information on the position on a plane of incidence of the PSD and an identifying number of the light source. The positions of the LEDs are determined by using the output signal.

1 Claim, 12 Drawing Sheets

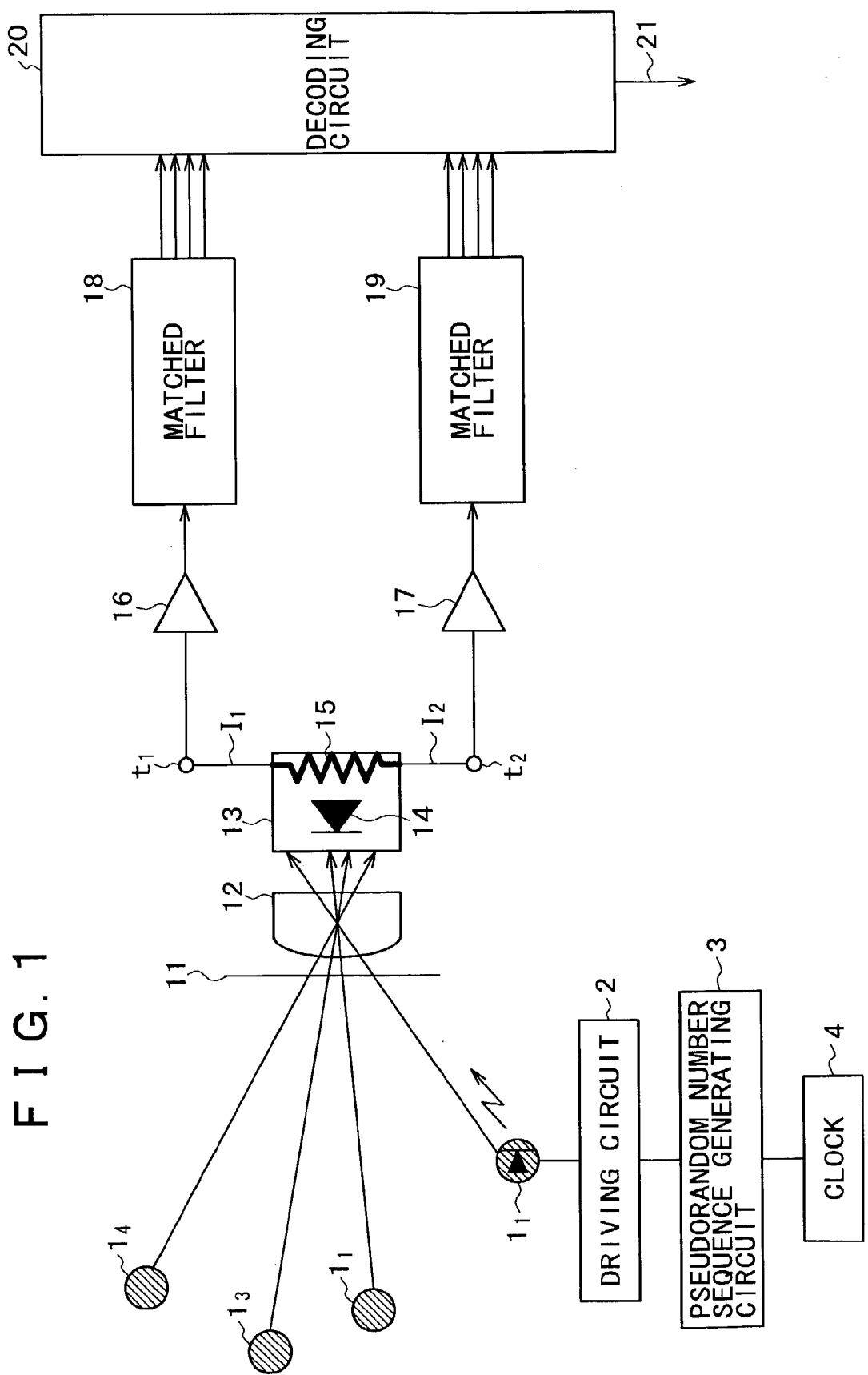

F I G. 6
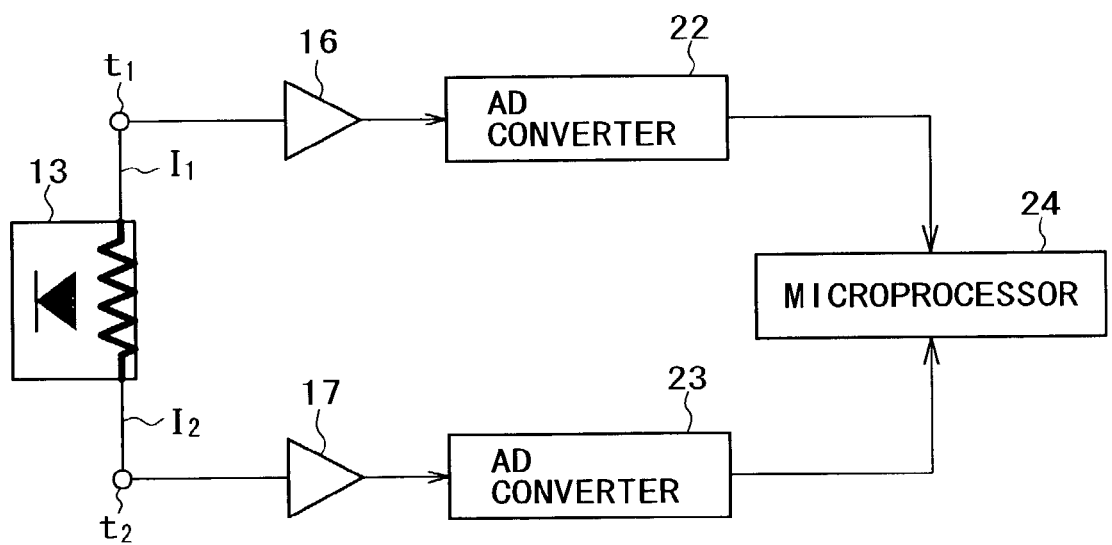

F I G. 1 1
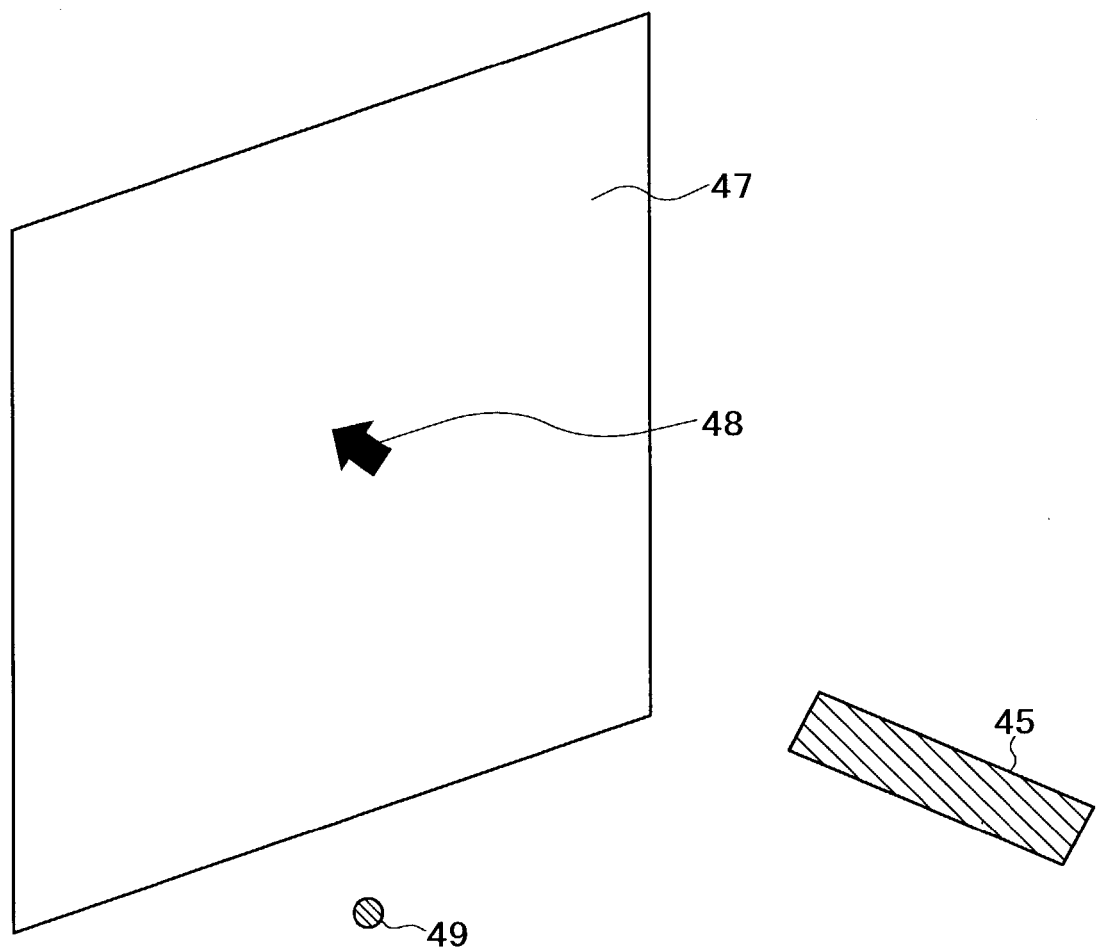

POSITION RECOGNIZING DEVICE AND POSITION RECOGNIZING METHOD

BACKGROUND OF THE INVENTION

The present invention relates to a position recognizing device and a position recognizing method for recognizing a position of a light emitting unit.

For optical three-dimensional pointing devices and motion capture systems for capturing motion of a human body and thereby generating data for creating animation, a method is proposed which makes a plurality of light emitting units, for example LEDs (Light Emitting Diodes) sequentially emit light and detects the light by means of a CCD (Charge Coupled Device), a CMOS (Complementary Metal Oxide Semiconductor) image sensor or the like, or a PSD (Position Sensitive Device). By integrating information on two-dimensional positions of a light source on image sensors or PSDs on principles of stereoscopic vision, it is possible to determine a three-dimensional position of the light emitting source in a real space.

In order to detect positions of a plurality of LEDs on an image sensor or on a PSD, the plurality of LEDs are made to emit light sequentially, and at a certain moment, only light from one LED is received on a light receiving plane of the image sensor. Therefore, synchronization between the LEDs and the image pickup device is required, and a signal transmission line (wire or radio) is required between the plurality of LEDs and the image pickup device, thus presenting a problem of a complex system.

The present applicant has proposed a system in which a transmitter including a circuit for generating an ID associated with an object and an LED blinking according to the ID is attached to the object, the blinking light is photographed by means of a CMOS image pickup device or the like having a relatively high frame rate, a received signal is decoded for each pixel of the image pickup device, the ID is obtained, and thereby the position of the LED on a light receiving plane of the image pickup device is determined. This system has a problem of a large scale of the image sensor and signal processing circuit.

SUMMARY OF THE INVENTION

Accordingly, it is an object of the present invention to provide a position recognizing device and a position recognizing method that solve the above problems, eliminate the need for system synchronization, and prevent an increase in the hardware scale.

In order to solve the above problems, according to a first aspect of the present invention, there is provided a position recognizing device for receiving light from at least one light source and recognizing a position of the light source, including: a position detecting element for receiving incident light having light intensity change corresponding to a pseudorandom number sequence unique to the light source, generating a photocurrent corresponding to intensity of the light at an incident position, the photocurrent flowing into a resistance from the incident position, and thereby providing a plurality of output signals corresponding to the incident position; a correlation operation unit for subjecting the plurality of output signals of the position detecting element and the pseudorandom number sequence to a correlation operation, and separating and extracting signals corresponding to the plurality of output signals using a result of the correlation operation; and a decoding unit for determining the incident position by subjecting the signals corresponding to the plurality of output signals from the correlation operation unit to an operation.

According to a second aspect of the present invention, there is provided a position recognizing method for determining an incident position by subjecting signals corresponding to a plurality of output signals obtained at a correlation operation step to an operation.

According to a third aspect of the present invention, there is provided a position recognizing device for receiving light from a plurality of light sources and recognizing a position of each of the light sources, including: light sources including generating circuits for generating pseudorandom number sequences unique to the respective light sources and a plurality of light emitting units for emitting light having light intensity change corresponding to the pseudorandom number sequences, respectively; at least two light receiving devices for receiving the light from the plurality of light sources; and a processing device for calculating a two-dimensional position or a three-dimensional position of each of the plurality of light sources from incident position information obtained by each of the two light receiving devices; wherein each of the two light receiving devices includes: a position detecting element for receiving incident light from the plurality of light sources, generating photocurrents corresponding to intensity of the light at incident positions, the photocurrents flowing into a resistance from the incident positions, and thereby providing a plurality of output signals corresponding to the incident positions; a correlation operation unit for subjecting the plurality of output signals of the position detecting element and the pseudorandom number sequences to a correlation operation, and separating and extracting signals corresponding to the plurality of output signals using a result of the correlation operation; and a decoding unit for determining the incident positions by subjecting the signals corresponding to the plurality of output signals from the correlation operation unit to an operation.

According to a fourth aspect of the present invention, there is provided a position recognizing device for generating a spot for displaying a pointing position on a display screen, including: a pointing device having a light receiving device attached thereto, the light receiving device receiving, from a light source disposed in proximity to the display screen, light having light intensity change corresponding to a pseudorandom number sequence unique to the light source; and a processing device for determining the pointing position of the pointing device on the display screen from incident position information obtained by the light receiving device and generating the spot at the determined pointing position.

According to the present invention, since light from a light source has light intensity change corresponding to a pseudorandom number sequence unique to the light source, a light receiving device can obtain a plurality of output signals of a position detecting element, which output signals correspond to each light source, by subjecting the plurality of output signals of the position detecting element to a correlation operation using the pseudorandom number sequence. By subjecting the plurality of output signals to an operation, the light receiving device can detect a position on a plane of incidence of the position detecting element. Further, the position of the light source can be calculated from the position on the plane of incidence. Therefore synchronization between the light source and the light receiving device is not required, and thus no signal transmission line for the synchronization is required. Further, as compared with the method that photographs blinking light by means of a CMOS image pickup device or the like, decodes a received signal for each pixel of the image pickup device, obtains an ID, and thereby determines the position of an LED on a light receiving plane of the image pickup device, the present invention has an advantage in that a circuit for decoding the received signal for each pixel is not required and therefore the problem of a large scale of hardware is not presented.

BRIEF DESCRIPTION OF THE DRAWINGS

FIG. 1 is a block diagram of an embodiment of a position recognizing device according to the present invention;

FIG. 6 is a block diagram showing a configuration when correlation operation is performed by software processing by a microprocessor;

FIG. 11 is a schematic diagram showing another example of configuration when the present invention is applied to a pointing device.

DETAILED DESCRIPTION OF PREFERRED EMBODIMENTS

Figure 2:
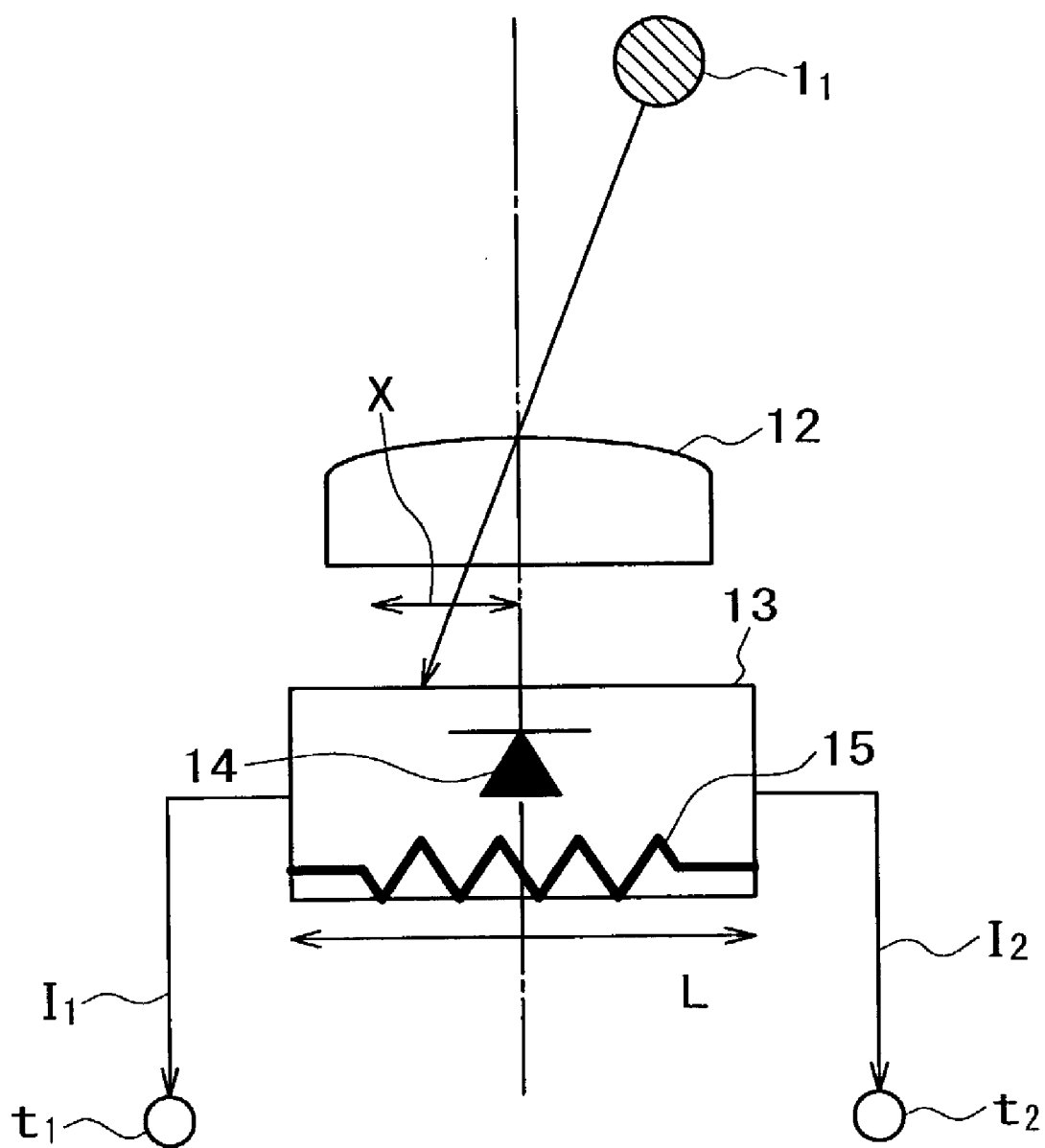
FIG. 2 is a schematic diagram showing a configuration of an example of an image position detecting device that can be used for the present invention.

A preferred embodiment of the present invention will hereinafter be described. A system according to the embodiment is roughly divided into a light source and a light receiving device. Describing the light source, reference numerals $1_1$, $1_2$, $1_3$, and $1_4$ in FIG. 1 each denote a light emitting element, for example an LED. The LEDs $1_1$ to $1_4$ emit light of a specific wavelength such as infrared rays or the like.

The LED $1_1$ is driven by a pseudorandom number sequence (PN sequence: referred to also as a pseudonoise or pseudorandom sequence) supplied via a driving circuit 2. The pseudorandom number sequence is generated by a pseudorandom number sequence generating circuit 3 using a clock from a clock generating circuit 4. Though not shown, each of the other LEDs $1_2$, $1_3$, and $1_4$ is also driven by a pseudorandom number sequence. The LEDs $1_1$ to $1_4$ generate light having light intensity change corresponding to their respective pseudorandom number sequences. For example, the LEDs are turned on at a "1" section of the binary pseudorandom number sequences, and the LEDs are turned off at a "0" section of the binary pseudorandom number sequences. The pseudorandom number sequences for turning on and off the LEDs are bit sequences different from each other.

As an example of the pseudorandom number sequence, there is an M-sequence (Maximum-length linear shift-register sequence). A pseudorandom number sequence having a cycle of $(2^m-1)$ bits can be generated by appropriately selecting feedback taps of an m-stage linear shift register. Pseudorandom number sequences of different bit sequences having the same cycle can be generated by changing the position of the feedback taps. Each of the pseudorandom number sequences different from each other for driving the LEDs $1_1$ to $1_4$ is given an identifying number. Incidentally, the pseudorandom number sequences can be generated not only by the hardware configuration but also by software processing by a microprocessor.

The light receiving device will next be described. Light from the LEDs $1_1$ to $1_4$ enters a PSD 13 via an optical filter 11 and a lens 12. The optical filter 11 selects the light of a specific wavelength generated by the LEDs $1_1$ to $1_4$. The lens 12 is intended to collect the light from the LEDs $1_1$ to $1_4$ on a plane of incidence of the PSD 13. The PSD 13 comprises a photoelectric layer 14 for generating a photocurrent corresponding to intensity of a bright spot image occurring at an incident position of the light, and a resistance layer 15 laminated to the photoelectric layer 14 and receiving the photocurrent that is generated in the photoelectric layer 14 and flows in from the incident position.

The PSD 13 will be described with reference to FIG. 2. FIG. 2 shows an example of a PSD that makes one-dimensional position detection and outputs output currents $I_1$ and $I_2$ from both terminals, that is, output terminals $t_1$ and $t_2$, respectively, of the resistance layer 15. Suppose that length of the resistance layer 15 is L. The photocurrent generated at the position of the incident light in the photoelectric layer 14 flows into the resistance layer 15, and is then divided and extracted as output currents $I_1$ and $I_2$. When the photocurrent flows in from the center of the resistance layer 15, the output currents $I_1$ and $I_2$ are equal to each other.

As shown in FIG. 2, supposing that light of the LED $1_1$ is incident at a position displaced by x from the center (origin), a photocurrent resulting from the light flows in to a corresponding position of the resistance layer 15. In this case, a relation between the output currents $I_1$ and $I_2$ and the position x is expressed by the following equation:

$$(I_1-I_2)/(I_1+I_2)=2x/L$$

The PSD 13 performs one-dimensional position detection; however, it is easy to expand the one-dimensional position detection to two-dimensional position detection. In the case of the two-dimensional position detection, the PSD 13 performs position detection in both a vertical direction and a horizontal direction. A coordinate position (x, y) with a central position of the plane of incidence of the PSD as an origin is determined.

Returning to FIG. 1, matched filters 18 and 19 are connected to the output terminals $t_1$ and $t_2$ of the PSD 13 via amplifiers 16 and 17, respectively. Output signals of the matched filters 18 and 19 are supplied to a decoding circuit 20. For each light source photographed, the decoding circuit 20 generates an output signal 21 including information on the position on the plane of incidence of the PSD 13 and a pseudorandom number sequence number (identifying number) of the light source.

Each of the matched filters 18 and 19 separates the signal generated on receiving the light of each of the LEDs by detecting a correlation between the output current of the PSD 13 and the pseudorandom number sequences for driving the four LEDs $\mathbf{1}_1$ to $\mathbf{1}_4$. Thus, an output current $I_1$ component corresponding to each of the LEDs is separated and extracted from the matched filter 18, and similarly, an output current $I_2$ component corresponding to each of the LEDs is separated and extracted from the matched filter 19. The decoding circuit 20 calculates the above-mentioned equation using the output current $I_1$ component and the output current $I_2$ component corresponding to each of the LEDs, and thereby determines the incident position. The determined incident position and the identifying number are outputted from the decoding circuit 20.

Figure 3:
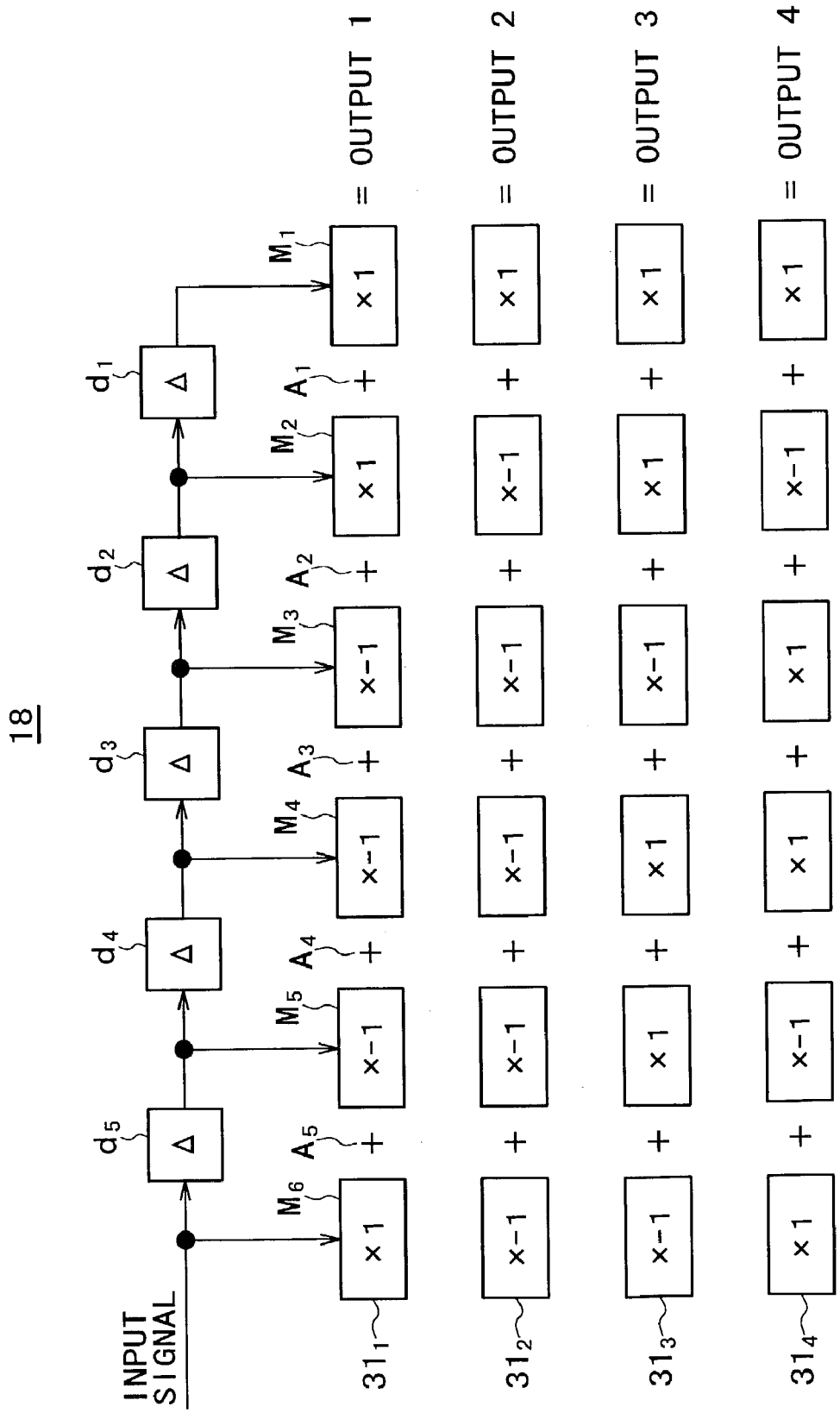
FIG. 3 is a block diagram of an example of a matched filter in the embodiment of the present invention.

FIG. 3 shows an example of the matched filter 18. Though not shown, the other matched filter 19 is of the same configuration as the matched filter 18. As an example, the cycle of the pseudorandom number sequences is set to six. An input signal from the amplifier 16 is inputted to a series connection of delay elements $d_1$ to $d_5$ each having a unit delay time $\Delta$. The unit delay time $\Delta$ is equal to a clock cycle of the pseudorandom number sequences for driving the LEDs $\mathbf{1}_1$ to $\mathbf{1}_4$.

Outputs of six taps provided to the series connection of the delay elements $d_1$ to $d_5$ are supplied to operation circuits $\mathbf{31}_1$ to $\mathbf{31}_4$ for correlation detection. The correlation operation circuit $\mathbf{31}_1$, for example, has a configuration of a product-sum operation circuit including a multiplier circuit $M_1$ for multiplying an output of the delay element $d_1$ by 1, a multiplier circuit $M_2$ for multiplying an output of the delay element $d_2$ by 1, a multiplier circuit $M_3$ for multiplying an output of the delay element $d_3$ by −1, a multiplier circuit $M_4$ for multiplying an output of the delay element $d_4$ by −1, a multiplier circuit $M_5$ for multiplying an output of the delay element $d_5$ by −1, a multiplier circuit $M_6$ for multiplying the input signal by 1, and adder circuits $A_1$ to $A_5$ for adding outputs of the multiplier circuits $M_1$ to $M_6$ together. A result of the product-sum operation is extracted as an output 1 corresponding to the LED $\mathbf{1}_1$.

The multiplier circuits $M_1$ to $M_6$ correspond to bits of the pseudorandom number sequence for driving the LED $\mathbf{1}_1$. Specifically, when a bit of the pseudorandom number sequence is "1," a ×1 multiplier circuit is used, and when a bit of the pseudorandom number sequence is "0," a ×−1 multiplier circuit is used. In the example of FIG. 3, the pseudorandom number sequence for driving the LED $\mathbf{1}_1$ is (110001).

As with the operation circuit $\mathbf{31}_1$ described above, the other operation circuits $\mathbf{31}_2$ to $\mathbf{31}_4$ have a configuration of a product-sum operation circuit for adding outputs of multiplier circuits corresponding to the pseudorandom number sequences for driving the LEDs $\mathbf{1}_2$ to $\mathbf{1}_4$, respectively. An output 2, an output 3, and an output 4 are extracted from the product-sum operation circuits. As an example, the pseudorandom number sequence for driving the LED $\mathbf{1}_2$ is (100000); the pseudorandom number sequence for driving the LED $\mathbf{1}_3$ is (110110); and the pseudorandom number sequence for driving the LED $\mathbf{1}_4$ is (101101).

As an example, a case where only light from the LED $\mathbf{1}_1$ as an input signal enters the PSD 13 will be described. The PSD 13 is driven by the pseudorandom number sequence of (110001), and an output signal of the PSD 13 changes by repeating (110001). The input signal appears in each of the outputs of the delay elements $d_1$ to $d_5$. In timing in which the last bit is inputted, a value of the output 1 is increased. That is, a value of correlation between the input signal and the pseudorandom number sequence is increased.

Figure 4:
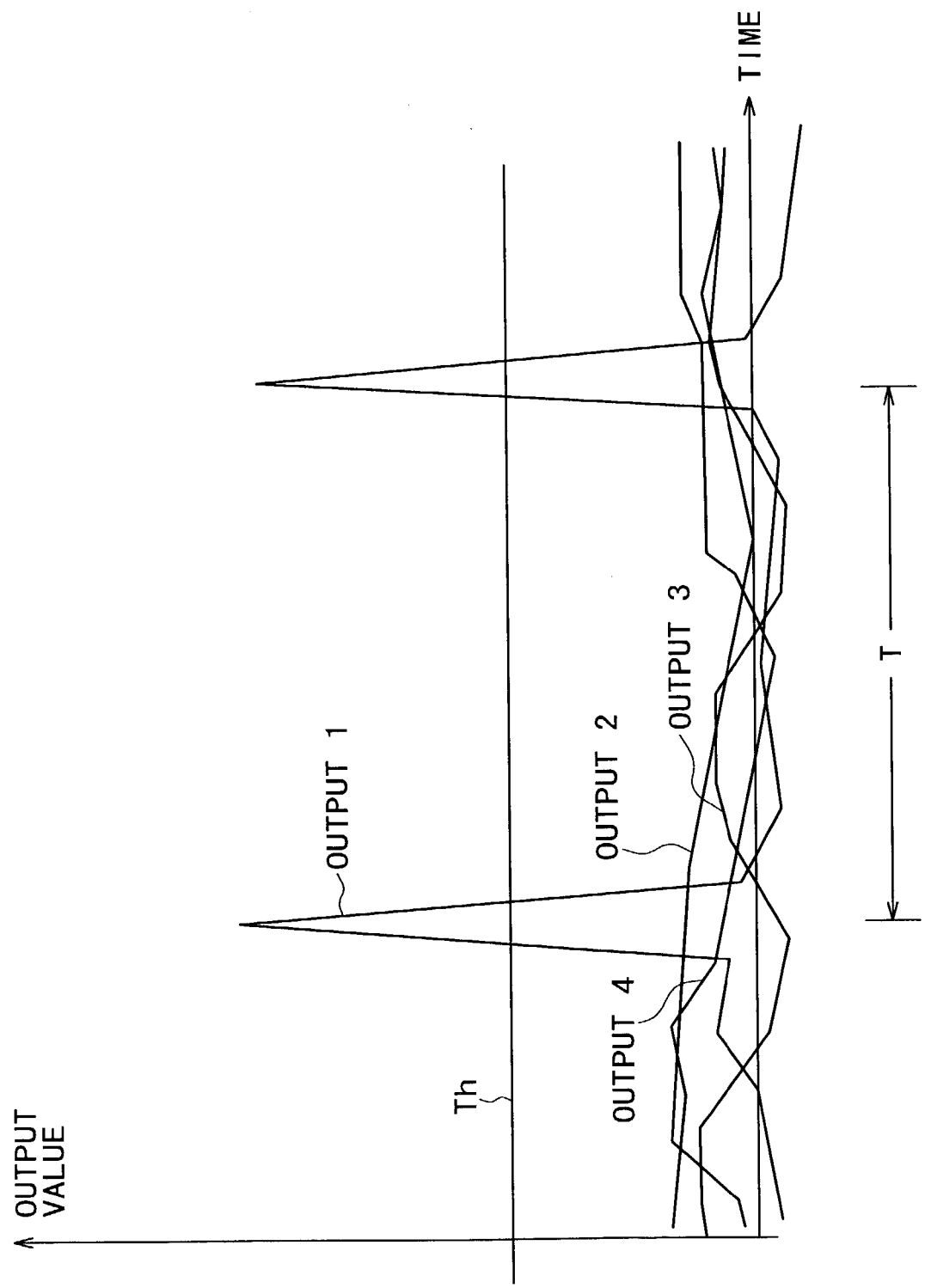
FIG. 4 is a schematic diagram showing an example of outputs of the matched filter.

FIG. 4 schematically shows change with time of the outputs of the matched filter 18. A peak value of the output 1 occurs at intervals of a cycle T (a 6-clock cycle in this example). On the other hand, since the output 2, the output 3, and the output 4 are results of detection of correlation between the other pseudorandom number sequences and the input signal, an output value of the output 2, the output 3, and the output 4 is not increased, as shown in FIG. 4. An appropriate threshold value Th is specified; when an output signal exceeds the threshold value Th, the signal is recognized. Thus, an output signal of the PSD 13 resulting from light arriving from each of the LEDs is separated. Also, a value corresponding to one output current $I_1$ of the PSD 13 is obtained on the basis of the peak value exceeding the threshold value Th.

Figure 5:
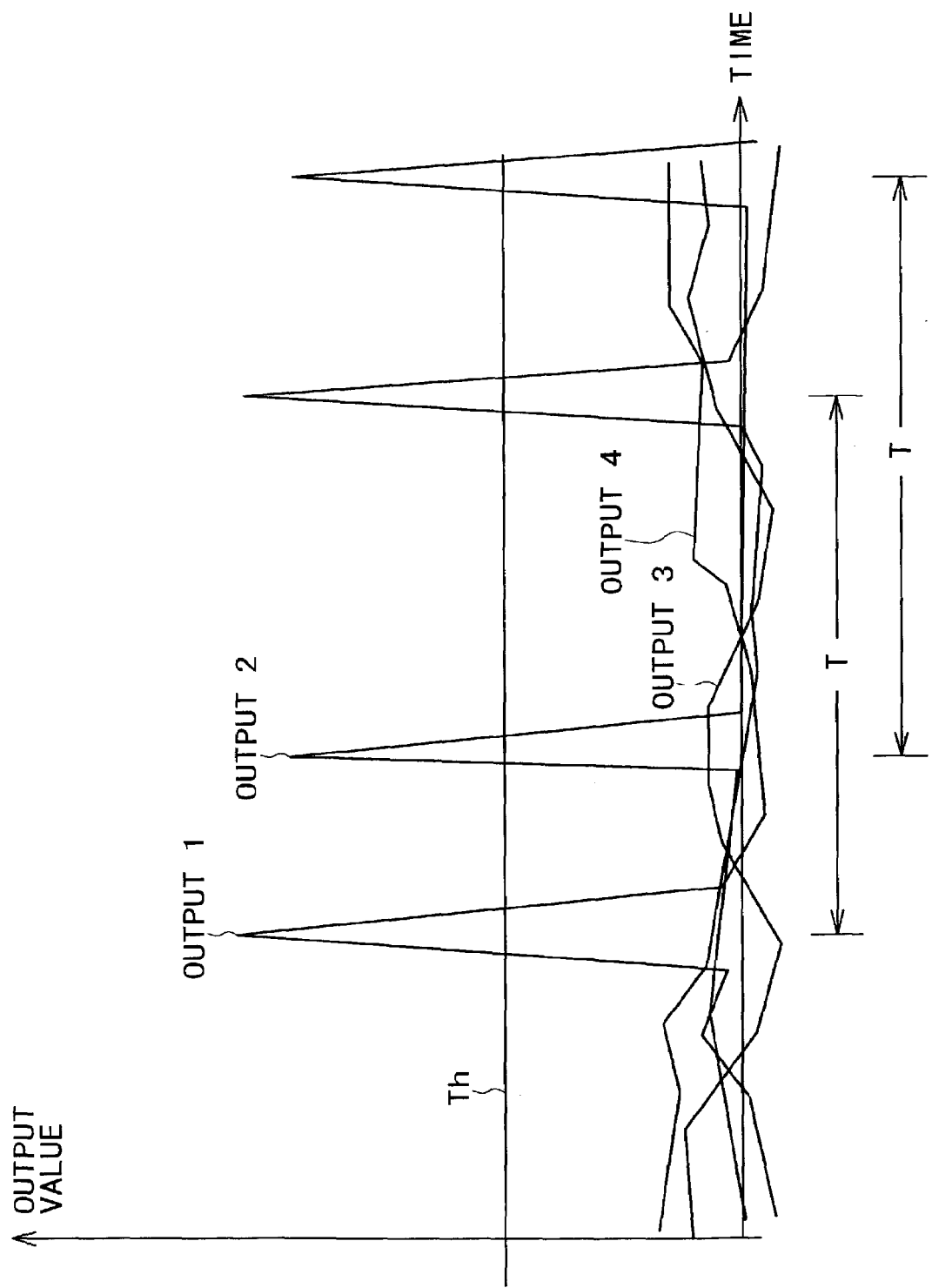
FIG. 5 is a schematic diagram showing another example of outputs of the matched filter.

FIG. 5 schematically shows another example of change with time of the outputs of the matched filter 18. FIG. 5 shows the outputs when the LEDs $\mathbf{1}_1$ and $\mathbf{1}_2$ emit light and the light from the LEDs $\mathbf{1}_1$ and $\mathbf{1}_2$ enters the PSD 13. The output 1 is generated whose output value reaches a peak in each cycle T by receiving the light from the LED $\mathbf{1}_1$, and the output 2 is generated whose output value reaches a peak in each cycle T by receiving the light from the LED $\mathbf{1}_2$. The other outputs 3 and 4 do not exceed the threshold value Th. Thus, information indicating the light emission of the LEDs $\mathbf{1}_1$ and $\mathbf{1}_2$ and output current $I_1$ components corresponding to the light receiving positions can be obtained.

The other matched filter 19 separates and extracts a value corresponding to the output current $I_2$ of each of the plurality of LEDs $\mathbf{1}_1$ to $\mathbf{1}_4$. Thus, the matched filters 18 and 19 can recognize the light sources and output the output current $I_1$ components and the output current $I_2$ components independently each other.

The output signals of the matched filters 18 and 19 are supplied to the decoding circuit 20. The decoding circuit 20 calculates the incident position x using the above-mentioned operation equation. When light from a plurality of LEDs emitting light simultaneously enters the PSD 13, the incident position of the light from each of the LEDs is determined. The decoding circuit 20 outputs an output signal 21 including an identifying number for identifying the LED and information on the incident position.

In the case of a two-dimensional PSD, a matched filter is connected to each of four output terminals of the PSD, and outputs of the four matched filters are supplied to the decoding circuit 20. The decoding circuit 20 calculates two-dimensional incident positions x and y. When light from a plurality of LEDs emitting light simultaneously enters the PSD, the two-dimensional incident positions of the light from each of the LEDs are determined.

In the above description, the matched filters 18 and 19 and the decoding circuit 20 are formed by hardware. As shown in FIG. 6, however, processing performed by the matched filters 18 and 19 and the decoding circuit 20 may be realized by converting the output signals of the amplifiers 16 and 17 into digital signals by means of AD converters 22 and 23, respectively, supplying the output signals of the AD converters 22 and 23 to a microprocessor 24, and performing software processing by means of the microprocessor 24.

Figure 7:
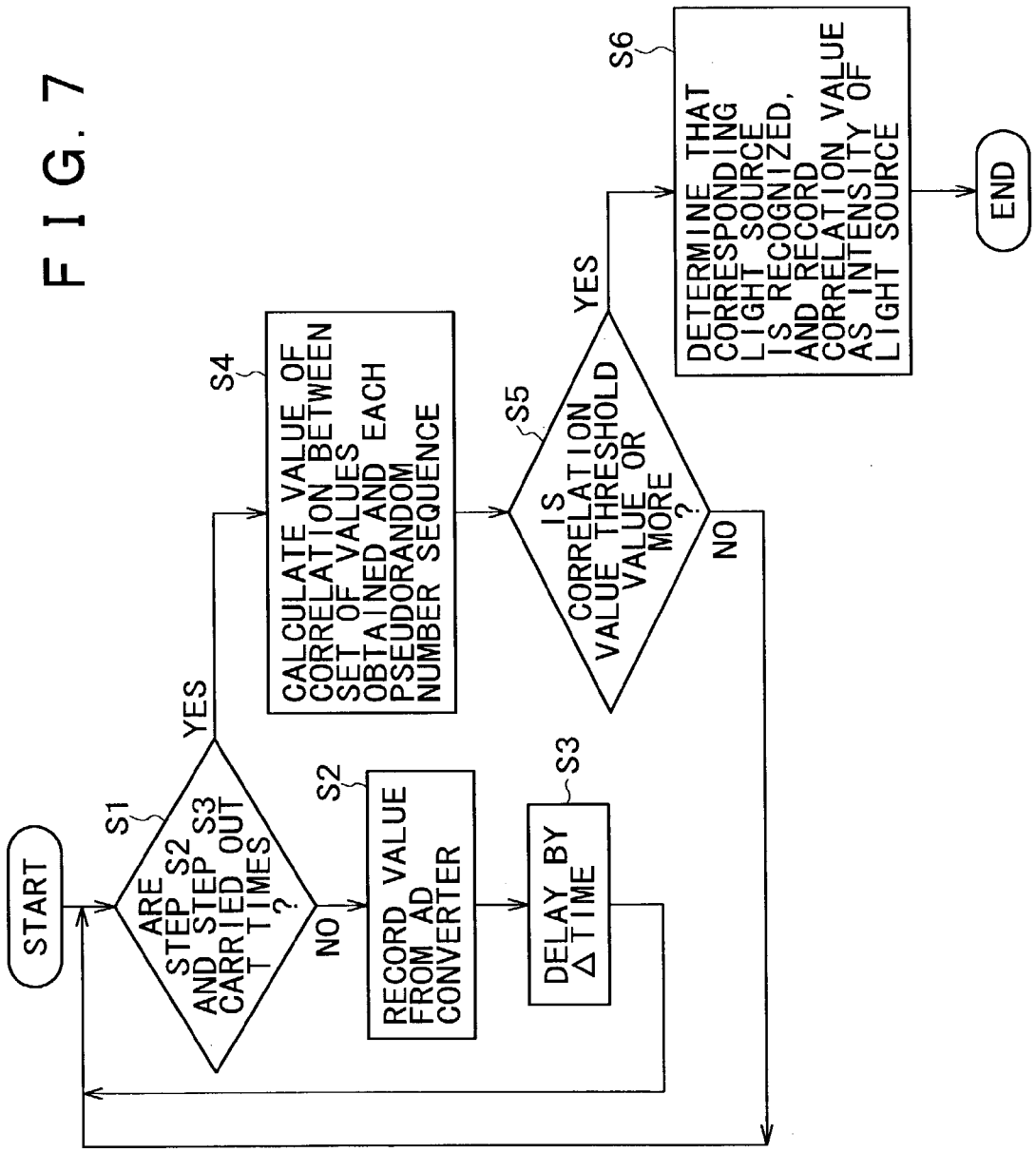
FIG. 7 is a flowchart of assistance in explaining the software processing.

FIG. 7 is a flowchart showing a flow of an example of the software processing. At a first step S1, whether processing at a step S2 and a step S3 is performed a number of times corresponding to the cycle T of the pseudorandom number sequences is determined. At the step S2, a value from the AD converter 22 is recorded. At the next step S3, the value is delayed by the clock cycle $\Delta$, and then the processing returns to the step S1. The recording of a value from the AD converter 22 and the delaying of the value by the time Δ are repeated T times.

After the processing at the step S2 and the step S3 is performed T times, a value of correlation between a set of the T values obtained from the AD converter and each of the pseudorandom number sequences is calculated at a step S4. This calculation is the same as that performed by the product-sum operation circuits of FIG. 3. The calculation with reference to each of the pseudorandom number sequences is performed sequentially or in parallel.

At a step S5, whether or not the correlation value calculated with reference to a pseudorandom number sequence is the threshold value or more is determined. When the correlation value is smaller than the threshold value, the processing returns to the step S1 to calculate a correlation value for next T output values from the AD converter. Of the T output values, T−1 output values coincide with the previous output values.

When it is determined at the step S5 that the correlation value is the threshold value or more, the processing proceeds to a step S6. At the step S6, it is determined that the light source (LED, for example) corresponding to the pseudorandom number sequence for calculating the correlation value that is the threshold value or more is recognized, and the correlation value is recorded as intensity of the recognized light source. The processing is then ended. Incidentally, it may be determined that the light source is recognized only when the correlation value that is the threshold value or more is obtained a predetermined number of times or more consecutively.

By means of the decoding circuit 20 or the microprocessor 24, it is possible to recognize the light source emitting light and obtain information on the position of light incident from the light source on the PSD. The information on the incident position is used by an application. A few examples of the application will be described in the following.

Figure 8:
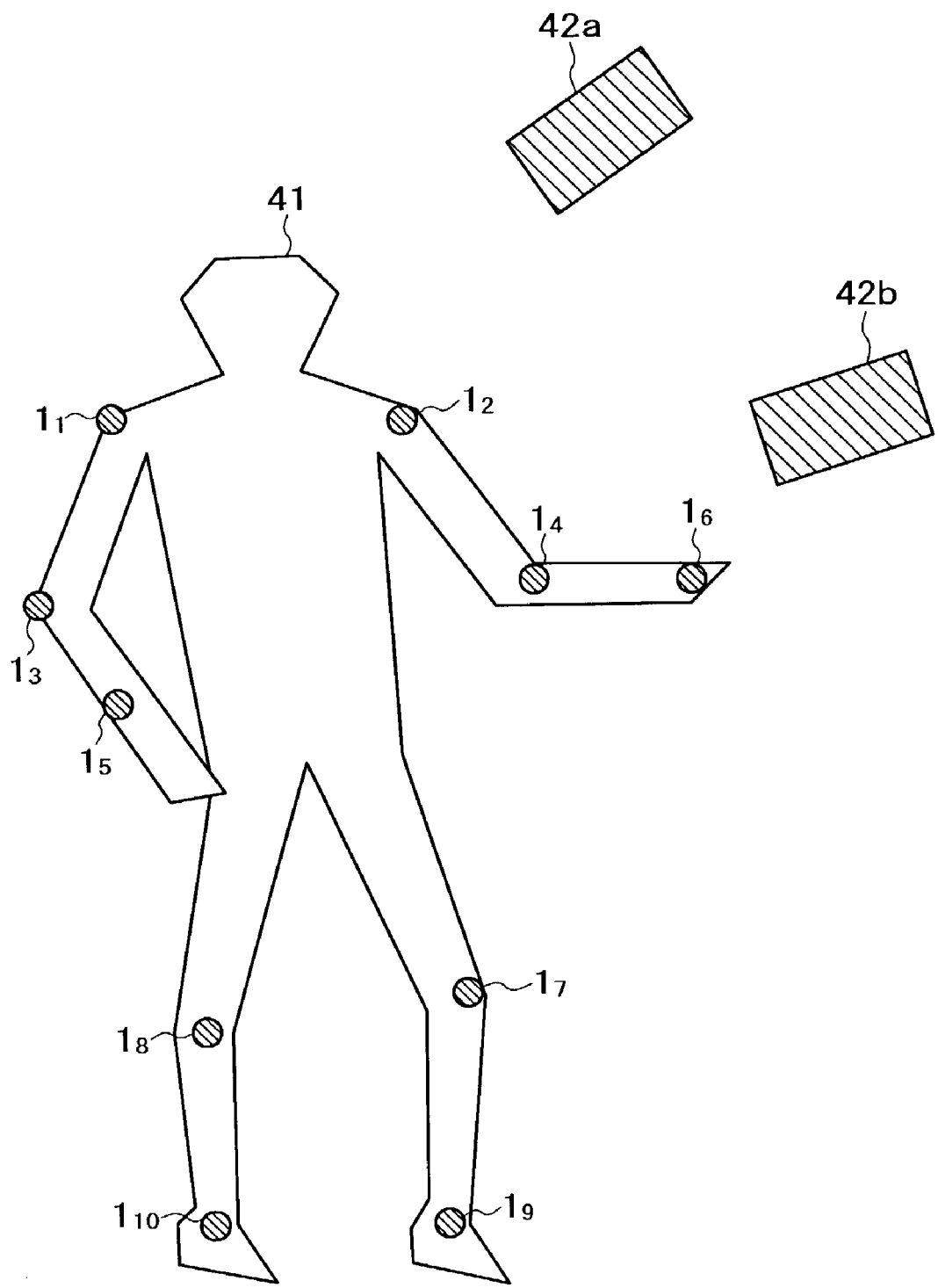
FIG. 8 is a schematic diagram showing a configuration when the present invention is applied to a motion capture apparatus.

FIG. 8 illustrates an example in which the present invention is applied to a motion capture apparatus. LEDs $1_1$ to $1_{10}$ as light sources are attached to parts, for example joint positions of a human body 41. As described with reference to FIG. 1, each of the LEDs is connected with a driving circuit 2, a clock generating circuit 3, and a pseudorandom number sequence circuit 4. Pseudorandom number sequences for driving the LEDs, for example M-sequences, are bit sequences different from each other with the same cycle. Light emitting units including the LEDs $1_1$ to $1_{10}$ and the circuit portions are very small, thus not hindering movement.

The LEDs $1_1$ to $1_{10}$ are photographed by two light receiving devices 42a and 42b. As described with reference to FIG. 1, each of the light receiving devices comprises a PSD, matched filters, a decoding circuit and the like. The PSD of each of the two light receiving devices 42a and 42b detects one-dimensional or two-dimensional incident positions. Output signals of the light receiving devices 42a and 42b are supplied to a processing apparatus such as a computer or the like to measure two-dimensional positions or three-dimensional positions of the LEDs on principles of stereoscopic vision. Since the motion capture apparatus shown in FIG. 8 eliminates the need for synchronization between the LEDs $1_1$ to $1_{10}$ and the light receiving devices 42a and 42b, the transmission line for the synchronization does not need to be provided, so that the apparatus as a whole can be simplified.

Figure 9:
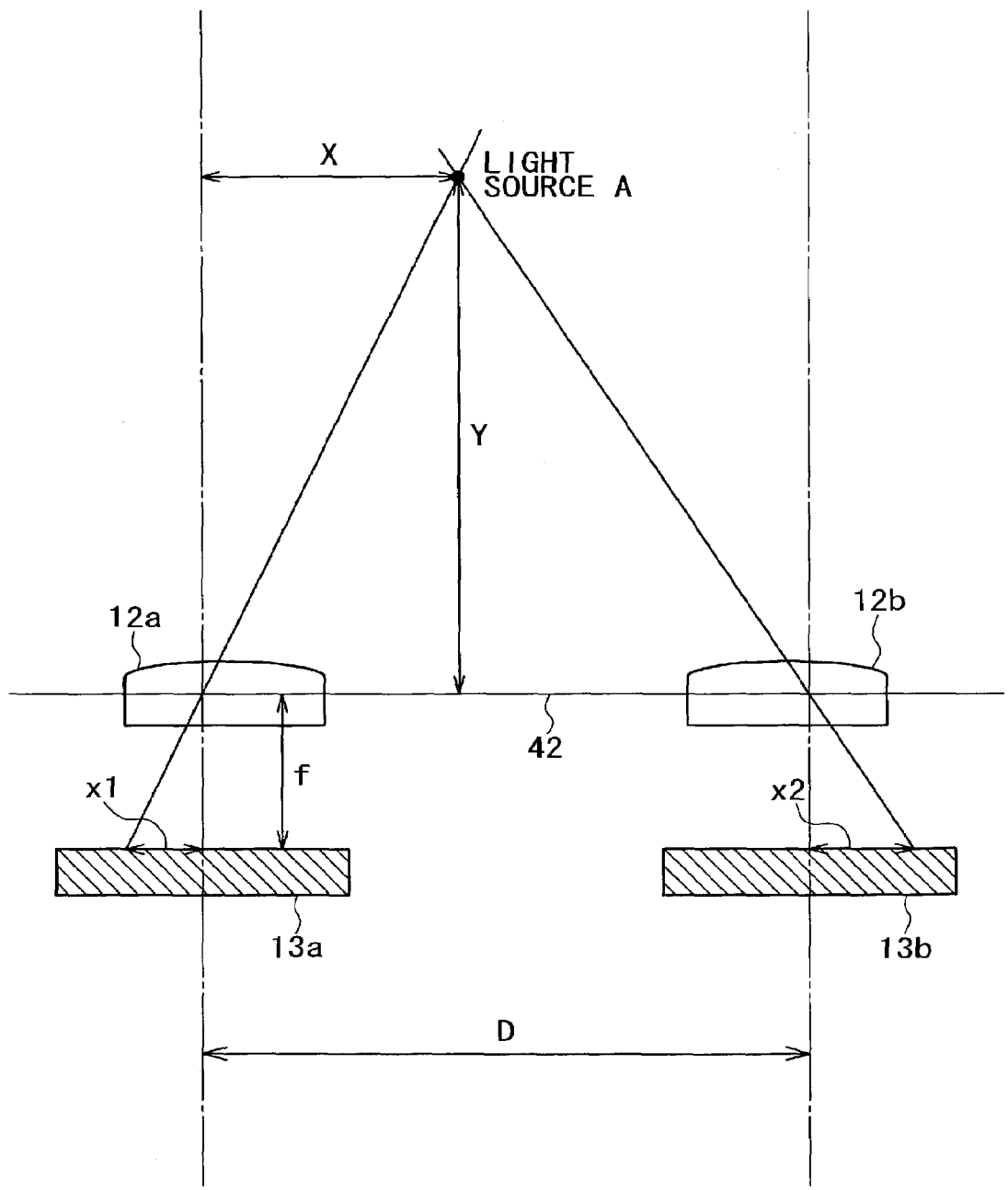
FIG. 9 is a schematic diagram of assistance in explaining a position detecting method on principles of stereoscopic vision.

FIG. 9 is a diagram of assistance in explaining a method of recognizing the two-dimensional position of a LED on principles of stereoscopic vision. FIG. 9 shows lenses 12a and 12b of the two light receiving devices and PSDs 13a and 13b thereof for detecting a one-dimensional incident position. Focal length of the lenses 12a and 12b is f. Planes of incidence of the PSDs 13a and 13b are arranged at the focal length f. An optical system including the lens 12a and the PSD 13a and an optical system including the lens 12b and the PSD 13b are disposed at an interval of a distance D. For simplicity, optical axes are assumed to be parallel to each other.

A light source A is photographed by the two optical systems. The light source A is present at a distance X from the optical axis of the lens 12a on a line parallel to a line 42 connecting a center of the lens 12a and a center of the lens 12b and at a distance Y from the line 42 on a line perpendicular to the line 42 on a two-dimensional plane including the two optical systems. An incident position on the plane of incidence of the PSD 13a is x1, and an incident position on the plane of incidence of the PSD 13b is x2. As described above, these incident positions x1 and x2 are obtained by supplying outputs of the PSDs 13a and 13b to the decoding circuits. The position (X, Y) of the light source A can be determined from the incident positions x1 and x2 as follows.

Figure 10:
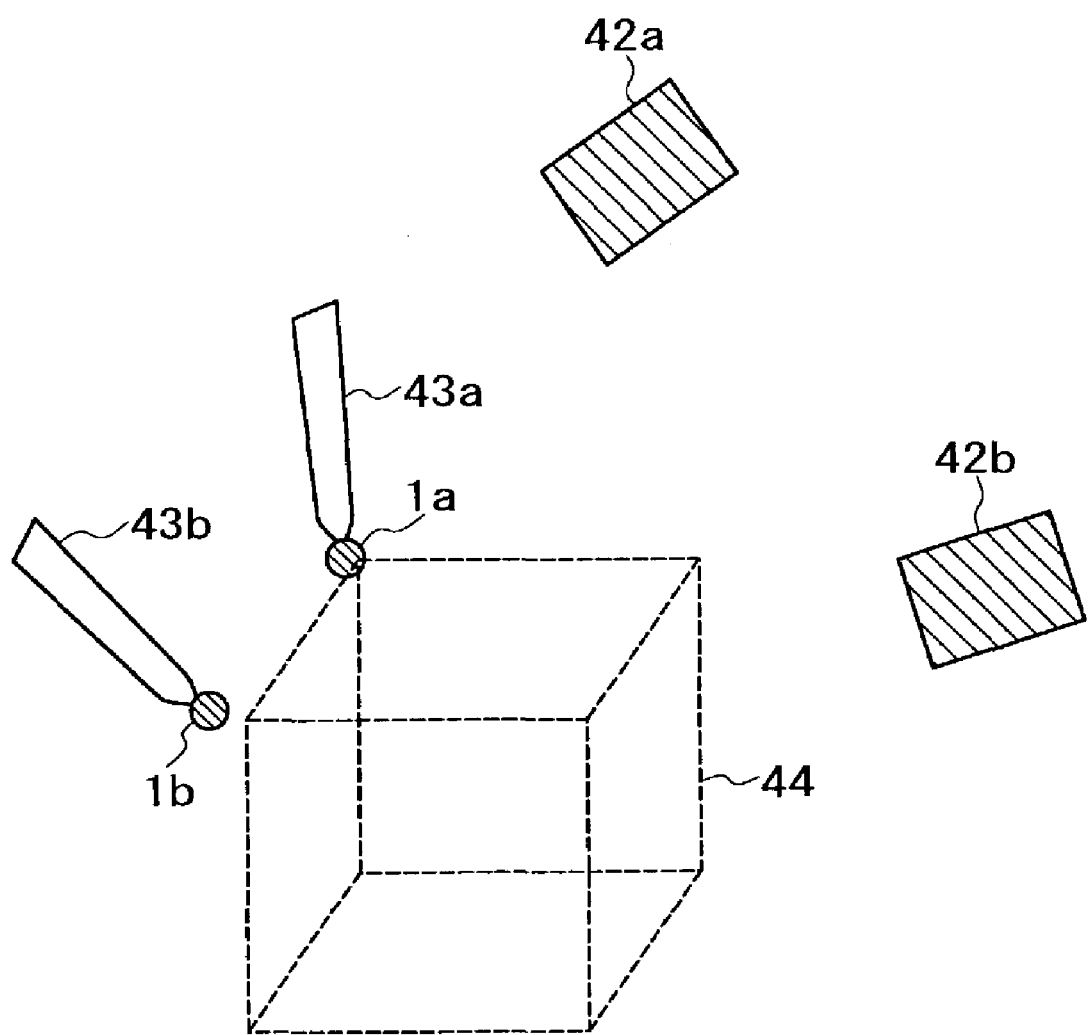
FIG. 10 is a schematic diagram showing an example of configuration when the present invention is applied to a pointing device.

The optical system including the lens 12a and the PSD 13a has a relation $X/Y=x1/f$ From $(D-X)/Y=x2/f$ the position is determined as $X=(D \cdot X)/(x1+x2)$ $Y=(f \cdot X)/(x1+x2)$ While the above example detects the position on the two-dimensional plane, the position of the light source A in a three-dimensional space can be similarly determined by using two light receiving devices having a two-dimensional PSD. Further, as shown in FIG. 10, a three-dimensional pointer can be formed by a pen 43a having an LED 1a attached to a tip thereof and two light receiving devices 42a and 42b for photographing the LED 1a. Detection of the position of the pen 43a when the pen 43a is moved tracing edges of a rectangular parallelepiped 44 as shown by a broken line, for example, makes it possible for a computer to draw the rectangular parallelepiped. A pen 43b having an LED 1b can be used simultaneously by associating different pseudorandom number sequences with the pens.

FIG. 11 is a diagram of assistance in explaining an example in which the present invention is applied to a pointing device. When a pointing device 45 having a light receiving device attached to an end surface thereof is directed to a relatively large display screen 47, a spot 48 is displayed at a position on the display screen 47 which position corresponds to a direction in which the pointing device 45 is directed. The display screen 47 is for example intended for presentation, and is a large display screen, a screen for displaying an image projected by a projector, or the like. A light source 49 such as an LED or the like is placed in proximity to the display screen 47, for example below the display screen 47.

Figure 12:
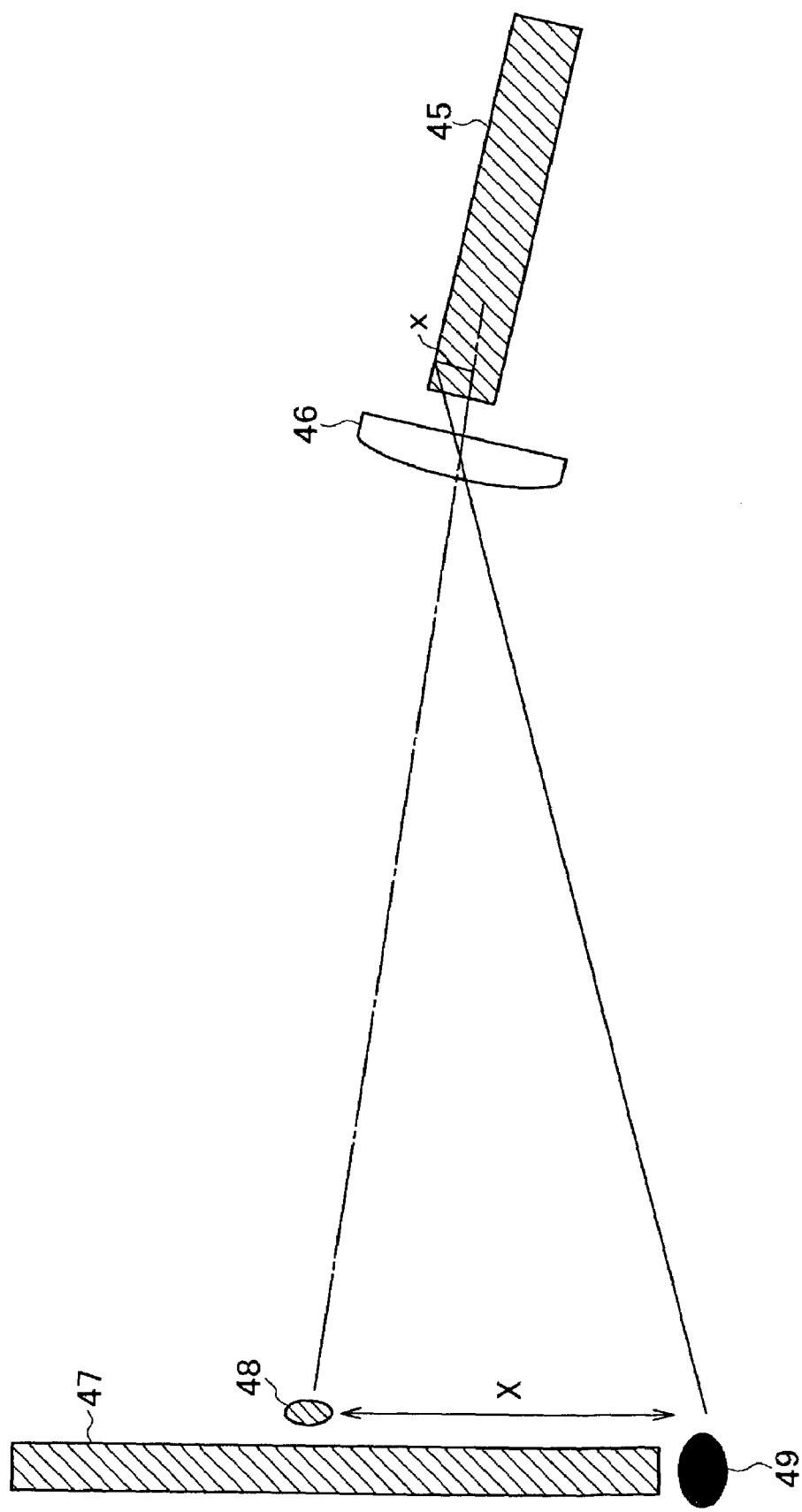
FIG. 12 is a schematic diagram of assistance in explaining a position detecting method when the present invention is applied to the pointing device.

As shown in FIG. 12, blinking light from the light source 49 is made incident on a plane of incidence of a PSD of the pointing device 45 via a lens 46. An incident position x on the plane of incidence of the PSD is detected. The incident position x is related to a position X of the spot 48 on the display screen 47 by a relation X=A·x, where A is an appropriate factor of proportionality. The display apparatus is controlled so that the spot 48 is displayed on the display screen 47 on the basis of the position X detected.

The present invention is not limited to the above-described embodiment thereof and the like; the present invention is susceptible of various modifications and applications without departing from the spirit and the scope of the present invention. For example, as the pseudorandom number sequence, a sequence other than the M-sequence, for example a Gold code may be used. The Gold code is obtained by calculating an exclusive OR of two different M-sequence outputs. In addition, a PSD configured to be able to counteract effects of noise light, background light and the like other than images formed by light from light sources may be used.

According to the present invention, since light from a light source has light intensity change corresponding to a pseudorandom number sequence unique to the light source, a light receiving device can separate a plurality of output signals of a position detecting element, which output signals correspond to each light source, by subjecting the plurality of output signals of the position detecting element to a correlation operation using the pseudorandom number sequence, and detect a position on a plane of light incidence of the position detecting element by subjecting the plurality of output signals to an operation. Therefore synchronization between the light source and the light receiving device is not required, and thus no signal transmission line for the synchronization is required. Further, as compared with the previously proposed method that photographs blinking light by means of a CMOS image pickup device or the like, decodes a received signal for each pixel of the image pickup device, obtains an ID, and thereby determines the position of an LED on a light receiving plane of the image pickup device, the present invention has an advantage in that a circuit for decoding the received signal for each pixel is not required and therefore the problem of a large scale of hardware is not presented.

While a preferred embodiment of the present invention has been described using specific terms, such description is for illustrative purpose only, and it is to be understood that changes and variations may be made without departing from the spirit or scope of the following claims.

What is claimed is:

1. A position recognizing device for receiving light from a plurality of light sources and recognizing a position of each of the light sources, comprising:

light sources including generating circuits for generating pseudorandom number sequences unique to the respective light source and a plurality of light emitting units for emitting light having light intensity change corresponding to said pseudorandom number sequences, respectively;

at least two light receiving devices for receiving the light from said plurality of light source; and a processing device for calculating a two-dimensional position or a three-dimensional position of each of a plurality of said light sources from incident position information obtained by each of the two said light receiving devices;

wherein each of the two said light receiving devices includes:

a position detecting element for receiving incident light from the plurality of said light sources, generating photocurrents corresponding to intensity of the light at incident positions, said photocurrents flowing into a resistance from said incident positions, and thereby providing a plurality of output signals corresponding to said incident positions;

a correlation operation unit for subjecting the plurality of output signals of said position detecting element and said pseudorandom number sequences to a correlation operation, and separating and extracting signals corresponding to said plurality of output signals using a result of the correlation operation; and a decoding unit for determining said incident positions by subjecting the signals corresponding to said plurality of output signals from said correlation operation unit to an operation.

* * * * *